Aug. 19, 1952  J. H. MENNIE  2,607,827
BRIDGE NETWORK
Filed Dec. 21, 1948
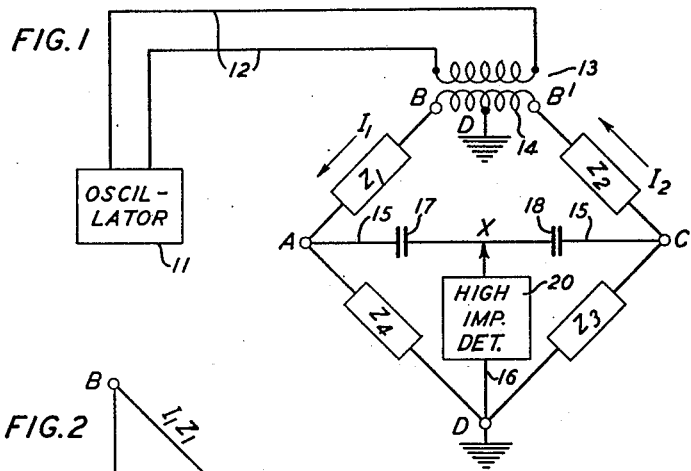
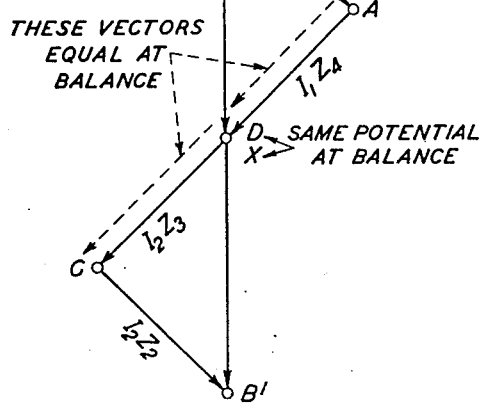
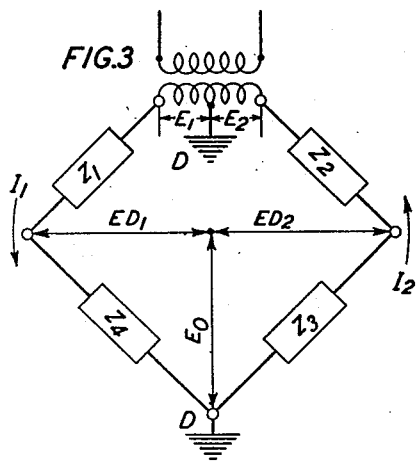
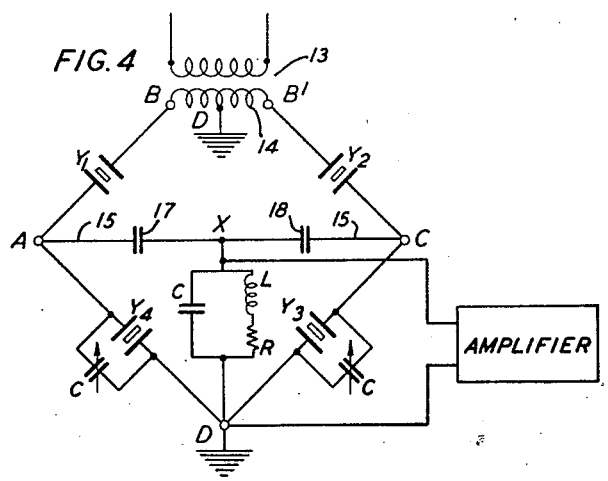
INVENTOR
J. H. MENNIE
BY
ATTORNEY Patented Aug. 19, 1952

2,607,827

UNITED STATES PATENT OFFICE 2,607,827

BRIDGE NETWORK

John H. Mennie, Livingston, N. J., assignor to Western Electric Company, Incorporated, New York, N. Y., a corporation of New York Application December 21, 1948, Serial No. 66,525

8 Claims. (Cl. 175—183)

This invention relates to bridge measuring circuits, and it is an object of this invention to provide an A. C. impedance bridge which is simple in design and which gives accurate measurements over a wide frequency and impedance range.

In the conventional current type of A. C. impedance bridge measuring circuit, a grounded source of driving potential is applied across the B and D corners of the bridge and a null indicator is connected across the A and C corners through a double shielded transformer. Since A. C. meters are not sensitive enough to indicate the degree of unbalance except at bridge voltages high enough to be dangerous and impractical, some type of amplification of the degree of unbalance is required. This is usually done by connecting an amplifier detector of the vacuum tube type to the bridge by means of a transformer.

In utilizing the transformer in the detecting circuit, it has been found that the inherent capacitive effect present in the transformer windings presents a problem that has to be overcome before the bridge circuit will function accurately. The distribution of the capacitive effect throughout the windings makes it difficult to neutralize this effect, and the expedient has been universally adopted of putting a shield around each winding of the transformer. This serves the purpose of concentrating this capacitive effect as an intershield capacitance so that it can be easily calculated and dealt with.

This intershield capacitance, which usually has a value of from 30 mmfs. to 200 mmfs., is then neutralized by the insertion of a compensating capacitance in the bridge circuit, so that the bridge is enabled to function accurately. In some variations of bridge circuits, compensation is made by the insertion of inductances into the circuit. Still other circuits require the use of two transformers instead of one.

It is obvious that the necessity of compensating this type of A. C. bridge circuit to offset the effect of the high intershield capacitance greatly complicates the design of these bridges. The compensation also has the definite effect of limiting the frequency range and the impedance range at which the bridge can operate. Another result is that the compensation part of the circuit often represents a major part of the cost of the entire equipment.

Applicant overcomes the problem presented by the intershield capacitance by a design which eliminates the transformer normally used in the detector circuit. In the principal embodiment, two sides of a bridge are driven 180° out of phase with each other in any convenient manner, as for example by means of a low impedance center tapped winding on a transformer. This type of circuit when provided with a low capacitance voltage dividing network may be directly connected to a high impedance detector which will indicate a null balance for the same impedance relationships between bridge arms that are well known for any standard bridge network.

Other objects and features will be apparent from the following detailed description when considered in conjunction with the accompanying drawing in which:

Fig. 1 is a schematic wiring diagram of the invention;

Fig. 2 is a vector diagram of the bridge voltages at balance;

Fig. 3 is a simplified bridge circuit diagram indicating the bridge voltages;

Fig. 4 illustrates the use of the invention in a crystal filter bridge circuit.

With reference to Fig. 1, the driving power for the A. C. impedance bridge shown therein is provided by an oscillator 11. This power is fed in through leads 12 to a low impedance transformer generally designated as 13. This transformer 13 has its secondary 14 tapped and connected to ground at its midpoint D. The opposite end terminals of the secondary 14 are designated as B and B'.

The other corners of the bridge are conventional and are given the standard designation as the A, C and D corners, the D corner being grounded. The four sides of the bridge, AB, B'C, CD and AD, each contain impedances standardly designated as Z1, Z2, Z3 and Z4, respectively.

A suitable lead 15 is connected between the A and C corners of the bridge. Another lead 16 is connected between the midpoint X of lead 15 and the D corner of the bridge. A capacitance 17 is connected in the lead 15 between the points A and X, and a capacitance 18 is connected in the lead 15 between the points X and C. These two capacitances are small, usually about one or two mmfs. They must be closely balanced in order to insure accurate operation of the bridge. The capacitances are of the air dielectric type and are insulated to ground. This gives the necessary rigidity, and also prevents the variation in dielectric losses resulting from the use of insulations other than air from affecting the operation of the two capacitances. It is possible to use any high impedance elements, such as resistors or inductances, as voltage dividers in place of the capacitances used in the main embodiment. However, the use of capacitances is preferred as it is easier to obtain balanced impedances over a wide frequency range with capacitances than with resistors or inductances.

Connected in the lead 16 between points X and D is a high impedance null detector 20 of any conventional type.

The balance principle of the proposed bridge can best be understood by means of the vector diagram shown in Fig. 2. With reference to this diagram:

Vector $BD=DB'$ (by design of transformer)
Vector $AD=DC$ (at balance)

Therefore, by geometry:

$$\frac{I_1Z_1}{I_1Z_4}=\frac{I_2Z_2}{I_2Z_3}$$

By dividing out $I_1$ and $I_2$:

$$\frac{Z_1}{Z_4}=\frac{Z_2}{Z_3}$$

or $$Z_1Z_3=Z_2Z_4$$

which is the standard bridge relation at balance.

The conventional bridge balance relationship may also be shown to apply to the proposed "out-of-phase" system by means of the simplified bridge circuit voltage diagram shown in Fig. 3. In Fig. 3 the following voltage relationship exists when the bridge is balanced, that is, when the detector voltage $E_0$ between X and D is zero:

$$E_{D1}=E_{D2}=I_1Z_4=I_2Z_3 \quad (1)$$

$E_1=E_2$ (by design of transformer)

It is apparent that:

$$E_1-I_1Z_4=I_1Z_1$$

and $$E_2-I_2Z_3=I_2Z_2$$

Therefore:

$$I_1Z_1=I_2Z_2 \quad (2)$$
$$I_1Z_4=I_2Z_3 \quad (3)$$

By dividing Equation 2 by Equation 3, we get:

$$\frac{Z_1}{Z_4}=\frac{Z_2}{Z_3}$$

or $$Z_1Z_3=Z_2Z_4$$

It is thus evident that any standard bridge network may be converted to the proposed system without altering or recomputing the network impedances.

In operation, the center tapping of the secondary 14 of transformer 13 causes the voltage in elements BD and B'D to be driven 180° out of phase with each other. This causes the voltages in BA and AD to be 180° out of phase with the voltages in B'C and CD, respectively. These latter out of phase voltages, along with the capacitance voltage dividing arrangement between the A and C corners, feed into the high impedance null detector 20. If the bridge is unbalanced, the difference in the opposing voltages AD and DC causes the detector to indicate the degree of unbalance. When the bridge is in balance, the voltages AD and DC are equal and opposite, and a null balance is produced in the detector.

Because of the small values of capacitances 17 and 18, the compensation needed on grounded bridge circuits in accordance with the invention is reduced to a point where it no longer complicates the design of the bridge, and to a point where the cost of such compensation becomes an insignificant factor. If the bridge is of the unity type, no compensation at all is needed.

Although the embodiment of the invention illustrated uses a transformer between the source of power and the bridge, the cost of this transformer is small compared to the double shielded transformer used in the conventional type of bridge circuit.

When designing a bridge based on the "out-of-phase" principle, it is extremely important to be sure that the two voltages developed across the split secondary winding of the input transformer are in exact 180° phase opposition over the desired frequency range. It is also very important, except for unity ratio bridges, to keep the reactance and resistance components of the secondary winding as low as possible in proportion to the $Z_1$ and $Z_2$ arms in series with these windings. This condition may be met by using a high permeability type core with but few turns for the secondary winding, and with the two halves of the secondary winding being closely coupled.

An illustration of the advantageous use of the invention in other types of circuits is shown by reference to Fig. 4, which illustrates a crystal filter circuit utilizing the bridge described in the present invention. A typical application for such a filter circuit would be as a channel filter for a carrier system, the circuit serving as a pass band to separate one channel from the others. In Fig. 4, the conventional filter circuit capacitances are designated as C, inductance as L, resistance as R and the four crystal bridge arms as $Y_1$, $Y_2$, $Y_3$ and $Y_4$.

By the use of the new bridge set up in place of the standard crystal bridge, the capacitances to ground are lowered, resulting in increased range and performance at high frequencies. The characteristic attenuation-frequency curve for the circuit is the same with either type of bridge. In addition, when the standard balanced to ground crystal filter circuit is used with an amplifier, it has to connect to the amplifier through a transformer, since the amplifier is grounded. The use of the described bridge circuit, since it is grounded, eliminates the need for this amplifier coupling transformer with a resultant saving in cost.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an A. C. bridge circuit, the combination of four impedance elements serially connected in a closed loop to form a bridge having two pairs of conjugate terminals, a connection grounding each terminal of one pair, means independent of said impedance elements for placing alternating potentials of opposite phases between the other terminals and ground, means for accurately determining the mean value of the potentials of the other terminals and means for measuring the potential difference between the mean value and ground.

2. In an A. C. bridge circuit, the combination of four impedance elements serially connected in a closed loop to form a bridge having two pairs of conjugate terminals, a connection grounding each terminal of one pair, means connected in series with the impedance elements for placing alternating potentials of opposite phases between the other terminals and ground, two small equal impedances connected in series between the other terminals, and means for indicating the potential with respect to ground of the point of connection between the impedances.

3. In an A. C. bridge circuit, the combination of a transformer, four impedance elements serially connected in a closed loop to form a bridge having two pairs of conjugate terminals, with the secondary winding of the transformer forming a part of two adjacent arms and the midpoint of the winding comprising one of the bridge terminals, connections grounding both the secondary midpoint and the other terminal of its pair, means operating through said transformer for placing alternating potentials of opposite phase between the other terminals and ground, and a capacitance voltage dividing network including two equal capacitances connected across the other terminals.

4. In an A. C. bridge circuit, the combination of a transformer, four impedance elements serially connected in a closed loop to form a bridge having two pairs of conjugate terminals, with the secondary winding of the transformer forming a part only of the series impedance of each of two adjacent arms and the midpoint of the winding comprising one of the bridge terminals, connections grounding both the secondary midpoint and the other terminal of its pair, means operating through said transformer for placing alternating potentials of opposite phase between the other terminals and ground, a capacitance voltage dividing network including two equal capacitances connected across the other terminals, and a null detector connected between ground and the midpoint of said network.

5. The method of operating a four terminal A. C. bridge network having one opposite pair of terminals grounded to form two bridge sides, said method comprising the steps of applying each of two alternating voltages equal in magnitude but opposite in phase serially in each of the two sides of the bridge, and establishing the midpoint in the potential gradient between the other opposite pair of terminals, and utilizing a change of the potential of the midpoint of the potential gradient produced by an unbalance in the network.

6. The method of operating a four terminal A. C. bridge network having one opposite pair of terminals grounded to form two bridge sides, said method comprising the steps of applying alternating potentials equal in magnitude but opposite in phase to the two sides of the bridge, establishing the midpoint in the potential gradient between the other opposite pair of terminals, and measuring the unbalance in the network in terms of the potential between the midpoint of the potential gradient and ground.

7. In an A. C. bridge circuit, the combination of four impedance elements serially connected in a closed loop to form a bridge having two pairs of conjugate terminals, a connection grounding each terminal of one pair, means for placing alternating potentials of opposite phases between the other terminals and ground, and means for responding to an unbalance of said bridge, said means including two small fixed and equal impedances connected in series between the other terminals, and a load circuit connected between ground and the point of connection between the impedances.

8. In an A. C. bridge circuit the combination of a transformer, four impedance elements, means connecting the four impedance elements and the secondary winding of the transformer serially in a closed loop to form a bridge having two pairs of conjugate terminals with one of said elements in each arm of the bridge, the secondary winding of the transformer forming a part of two adjacent arms and the midpoint of the secondary winding comprising one of the bridge terminals, connections grounding both the secondary midpoint and the other terminal of its pair, means operating through said transformer for placing alternating potentials of opposite phases between the other terminals and ground, a capacitance voltage dividing network including two equal impedances connected across the other terminals, and a null detector connected between ground and the midpoint of said network.

JOHN H. MENNIE.

REFERENCES CITED

The following references are of record in the file of this patent:

UNITED STATES PATENTS

| Number | Name | Date |
|---|---|---|
| 2,371,395 | Keeling, Jr. | Mar. 13, 1945 |
| 2,405,999 | Collar et al. | Aug. 20, 1946 |
| 2,424,677 | Brownlee | July 29, 1947 |
| 2,507,566 | Frisbie | May 16, 1950 |